(12) United States Patent
Shabtay

(10) Patent No.: US 6,530,514 B2
(45) Date of Patent: Mar. 11, 2003

(54) METHOD OF MANUFACTURING HEAT TRANSFER TUBES

(75) Inventor: Yoram Leon Shabtay, Prospect Heights, IL (US)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 09/894,983

(22) Filed: Jun. 28, 2001

(65) Prior Publication Data

US 2003/0001000 A1 Jan. 2, 2003

(51) Int. Cl.[7] .................. B23K 31/02; B21D 39/00; F28F 1/00
(52) U.S. Cl. .................. 228/183; 228/155; 228/157; 165/177
(58) Field of Search .................. 228/183, 155, 228/157; 165/177; 148/22–25

(56) References Cited

U.S. PATENT DOCUMENTS

| | | | |
|---|---|---|---|
| 4,251,907 A | * 2/1981 | Bleckmann et al. | 29/456 |
| 4,633,056 A | 12/1986 | Schlosser | 219/121 |
| 5,186,251 A | * 2/1993 | Joshi | 138/170 |
| 5,378,294 A | * 1/1995 | Rissanen | 148/433 |
| 5,423,112 A | * 6/1995 | Murphy et al. | 228/183 |
| 5,431,745 A | * 7/1995 | Koschlig et al. | 148/23 |
| 5,441,106 A | * 8/1995 | Yukitake | 165/177 |
| 5,579,837 A | * 12/1996 | Yu et al. | 165/177 |
| 5,704,423 A | 1/1998 | Letrange | 165/17.7 |
| 5,762,133 A | * 6/1998 | Dion | 165/173 |
| 5,765,634 A | * 6/1998 | Martins | 165/177 |
| 6,000,461 A | * 12/1999 | Ross et al. | 138/115 |
| 6,129,147 A | * 10/2000 | Dumetz et al. | 165/177 |
| 6,325,141 B2 | * 12/2001 | Yamauchi et al. | 165/177 |
| 6,342,106 B1 | * 1/2002 | Koch et al. | 148/24 |

FOREIGN PATENT DOCUMENTS

| | | |
|---|---|---|
| EP | 0 302 232 | 2/1989 |
| EP | 0 982 095 | 3/2000 |
| JP | 56-71520 A | * 6/1981 |
| JP | 58-100995 A | * 6/1983 |
| JP | 1-200134 A | * 8/1989 |
| WO | WO 99/02935 | 1/1999 |

* cited by examiner

Primary Examiner—M. Alexandra Elve
Assistant Examiner—L. Edmondson
(74) Attorney, Agent, or Firm—Winston & Strawn

(57) ABSTRACT

The invention relates to a method of manufacturing heat transfer tubes for a heat exchanger such as an automobile radiator. The tubes are preferably formed of copper or a copper alloy. A sheet of the material is folded into a shape that resembles a B and is brazed together with a brazing material that is free from flux. The brazing material is in the form of a foil or paste. The paste typically includes a powder filler, a binder, and a carrier, which may be a liquid or a wax.

18 Claims, 1 Drawing Sheet

METHOD OF MANUFACTURING HEAT TRANSFER TUBES

FIELD OF INVENTION

The present invention relates to a method of manufacturing a heat transfer device such as an automobile radiator from a flat copper alloy tube made of folded strip. The tube is sealed to prevent leakage during the brazing operation with a brazing paste or brazing foil inserted between the joining faces of the tube.

BACKGROUND OF THE INVENTION

Many methods for manufacturing heat exchange tubes exist in the art. Most of the methods involve folding a sheet of metal to form channels, applying a flux material to the folded metal, and then heating the folded metal and flux material while applying a brazing material. During the heating process, the flux material cleans the surfaces of the metal so that the brazing material can readily flow into any gaps between the folds to seal the gap and form joints. Generally, the entire sheet of metal is coated with the flux materials and the brazing material is applied later, or the entire sheet is coated with both the brazing and flux materials. Some metals or metal alloys that are difficult to braze, such as aluminum, must be cladded with a more readily brazable metal or alloy prior to use to facilitate this type of manufacturing process.

Some examples of this technology can be found in the patent literature. European Patent Application No. 0 302 232 discloses a heat exchange tube wherein the terminal edges of the sheet material are rolled towards the center of the material past vertical so that the edges are parallel with the sheet material when they are brazed thereto. U.S. Pat. No. 4,633,056 discloses a method for manufacturing a heat exchange tube having an oval cross-section and a cross web for such tubes. The tube is joined using electron beam welding. U.S. Pat. No. 5,186,251 discloses a heat exchange tube with double row flow passages. U.S. Pat. No. 5,441,106 discloses a heat exchange tube that includes a plurality of internal fins that extend along the length of the tube. The tube is formed of cladded aluminum billet and brazed together. U.S. Pat. No. 5,579,837 discloses a heat exchange tube having a partition formed by two legs having an angle of about 7° to 15° between them. The entire tube is coated with brazing flux prior to brazing. U.S. Pat. No. 5,704,423 discloses a heat exchange tube produced by assembling a main portion and a secondary portion of two different pieces of metal, each generally aluminum or an aluminum alloy. U.S. Pat. No. 5,765,634 discloses a heat exchange tube divided in two by a reinforcing partition. The partition consists of a pleat extending into the interior of the tube and formed in the sheet metal strip from which the tube is fabricated. Prior to joining the ends of the metal strip, one face of the strip is coated with braze metal. As can be seen from the foregoing, no one shape is universally accepted for radiator tube manufacture. These references would generally use a flux or paste containing flux to braze together the metal, especially when using aluminum.

The flux material is generally very corrosive to the tube material and must be removed after the brazing process is complete. This adds the extra step and expense to the process to ensure the flux is removed after brazing. It is often desirable to manufacture a heat exchange tube without the need for cladding or the application of a flux. One such fluxless copper alloy used as a brazing filler material is described in U.S. Pat. No. 5,378,294. It may be useful to use such an alloy as a brazing filler material in the manufacture of heat exchanger tubing.

Despite these techniques, there still is a need for improved heat exchanger tubing formation processes, and the present invention discloses a preferred process, which avoids the disadvantages of the known techniques.

SUMMARY OF THE INVENTION

The invention relates to a method of forming a tube for a heat exchanger which comprises providing a sheet of a metal or metal alloy that has a base and two ends; folding the ends of the sheet to form legs having sides that oppose one another and sides. that oppose the base of the sheet; further folding the ends of the sheet toward one another to form a pair of fluid passageways; applying a brazing material that can adhere to the sheet material without flux between the opposing sides of the legs and between the base and the sides of the legs that oppose the base of the sheet; and applying heat to the sheet and brazing material sufficient to melt the brazing material and have it adhere to the legs and the base to join the legs to one another and to the base of the sheet to form the tube.

In this method, the sheet is advantageously made of copper or a copper alloy and the brazing material comprises a copper alloy that is formulated to have a lower melting temperature than that of the sheet. The sheet is preferably heated to no more than about 20% above the melting temperature of the brazing material, which is generally in the form of a paste or foil. When a foil is used, the brazing material has a thickness of between about 0.01 to 0.05 mm and is applied by placement between the opposing sides of the legs and between the base and the sides of the legs that oppose the base of the sheet.

When a paste is utilized, it includes a metal or alloy powder filler, a binder, and a carrier. The powder filler preferably has a particle size of between 15 and 30 microns, and is preferably an alloy of copper, nickel, tin, and phosphorus. The most preferred alloy is one having about 1% to 5% nickel, about 15% to 20% tin, about 4% to 7% phosphorus, and copper. Of course, this material can also be used for the composition of the foil, since this material can bond to copper alloys without the need for flux.

When the carrier comprises a liquid, such as water or an alcohol, the paste brazing material can be applied by brushing, spraying, or dispensing. Advantageously, the tube is dried after the spraying or brushing of the paste brazing material onto the sheet to volatilize the carrier. Alternatively, the carrier can be a wax and the binder can be a thermoplastic material with the paste brazing material being heated during application to the sheet. For this embodiment, the method further comprises melting the wax carrier and thermoplastic material binder prior to applying the brazing material onto the legs and base of the sheet, followed by cooling of the sheet to fix the brazing material in position.

A preferred application of the method is for manufacturing an automobile radiator by preparing a plurality of heat exchanger tubes according to the invention disclosed herein and then and forming the tubes into an automobile radiator. The radiator that is made by this method is yet another embodiment of the invention.

BRIEF DESCRIPTION OF THE DRAWINGS

The invention will be better understood in relation to the attached drawings illustrating preferred embodiments, wherein.

DETAILED DESCRIPTION OF THE INVENTION

Figure 1:
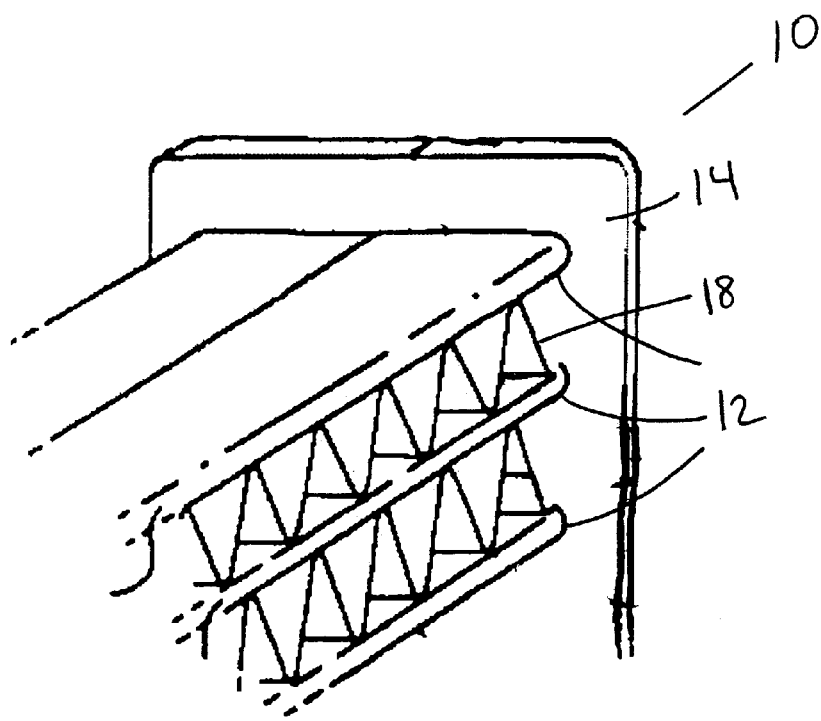
FIG. 1 shows a partial perspective view of an automobile radiator made according to the tube brazing process disclosed herein.

Referring to the drawings, FIG. 1 shows a heat exchanger 10 which is designed for use in automotive applications, such as a vehicle radiator. The heat exchanger 10 includes a set of substantially parallel tubes 12 extending between header plates 14. Cooling fluid runs through the tubes 12 between the header plates 14. Fins 18 are attached to the surface of the tubes 12 and run between the tubes 12 to facilitate the conduction of heat away from the tubes 12, and to provide extra surface area for convective heat transfer by air flowing over the heat exchanger 10.

This tube may be constructed of any suitable brazable material known to those of ordinary skill in the art. Preferably, the tube is made of copper or a copper alloy. In one embodiment, the tube metal comprises a CuZn 15 brass that contains about 1% of an additional alloying element to prevent softening of the material during the brazing operation. Typical alloying elements include tin or nickel. In another embodiment, the tube metal may be made of SM2385, an 85% copper brass commercially available from Outokumpu Copper Strip AB of Västerås, Sweden.

The tube 12 of the present invention is manufactured by bending the copper or copper alloy sheet. The sheet has a base 22 and two ends 23, 25. The ends 23, 25 are folded towards each other until they meet in the center of the sheet. During the fold, the opposing side portions 26, 28 and the top side 24 are formed. The ends 23, 25 are then bent to form the legs 40, 42. This creates an outline of the desired tubular structure, but the ends of the metal sheet are free and not joined.

Figure 2:
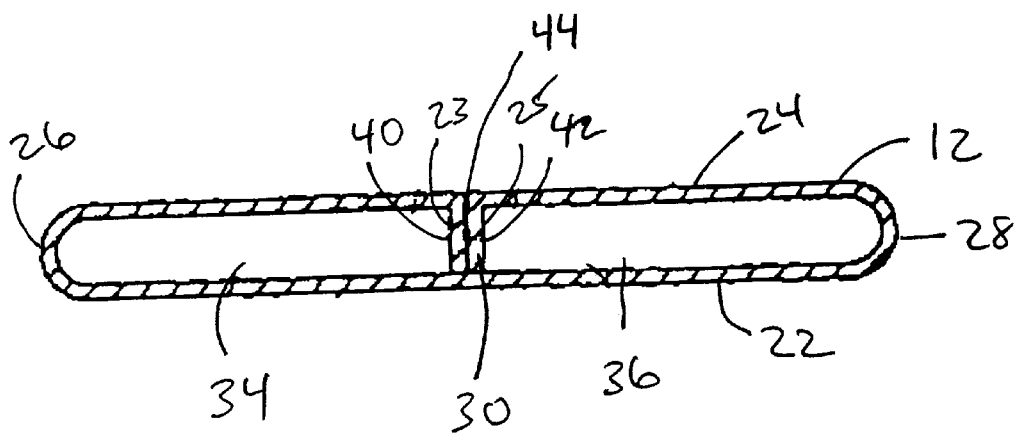
FIG. 2 shows a cross-sectional view of a heat exchanger tube manufactured according to the present invention.

FIG. 2 shows one of the tubes 12 of the heat exchanger 10. The tube 12 includes a base 22, a top side 24, and two generally arcuate, opposing side portions 26, 28. The tube 12 is generally rectangularly shaped and may have round ends, and further includes a partition 30 extending from the base 22 to the top side 24 to define a pair of fluid passageways 34, 36. The partition 30 includes a pair of legs 40, 42 that are bent from the top side 24.

To join the metal ends and form sealed channels, a novel brazing technique is utilized. In this procedure, either a paste or foil can be utilized. The paste comprises a metal or metal alloy powder, a binder, and a carrier. Generally, the powder is present as the main ingredient, with the binder present in an amount of about 3% to 20% by weight and the carrier being present in an amount of about 1% and 10% by weight. For example, in one embodiment, 100 grams of the powder is mixed with 10 grams of carrier and 2 grams of binder. The paste form of the braze material has the advantage of allowing the material to flow to the desired position on the tube before solidifying.

The carrier is preferably a liquid, such as water or an alcohol, so that the consistency of the paste is not too viscous to facilitate application by painting or brushing. Low molecular weight waxes can also be used. A most preferred carrier is mineral spirits. When the carrier is a liquid and the paste is applied to the parts to be brazed, a drying process is utilized. This is a simple heating process that evaporates most of the carrier, leaving only a small amount on the parts to be brazed, typically less than about 2%, and preferably all of the carrier is evaporated.

When the carrier is wax-based, the binder may be in thermoplastic form. The powder would then be mixed with the wax prior to application. During application of the paste, the thermoplastic binder is heated to 90° C. so that it melts. The paste solidifies upon application to the tube as the heat is transferred to the metal of the tube. No drying process is necessary when using a wax-based carrier, as the wax re-solidifies without such a process.

The powder is a filler that acts to fill the joint between the portions of the tube strip to be joined, while alloying with the tube metal. The filler may include any filler known to those of ordinary skill in the art, such as copper-phosphorus. Preferably, the filler is a copper-nickel-tin-phosphorus alloy, such as OKC600, which is commercially available. OKC600 comprises about 1% to 5% nickel, about 15% to 20% tin, about 4% to 7% phosphorus, and the balance copper. The binder acts as an adhesive to stick the filler to the desired surfaces. It is not necessary to add flux, since phosphorus acts as a flux, making the copper-nickel-tin-phosphorus a self-fluxing alloy resulting in better corrosion properties.

The filler is produced by gas-atomizing to spherical fine grained powder. The maximum particle size is generally about 90 µm, with the average particle size being about 5 µm to 60 µm and preferably about 15 µm to 30 µm.

The brazing paste is typically applied to the tube by spraying with a spray gun. Water-based paste is normally used for radiators with corrugated fins and harder solvent-based paste is used for flat push-tube radiators. The thickness of the brazing material is typically measured by weight. Preferably, the brazing material may be applied at about 100 to 300 g/m², and preferably at about 150 g/m² to 200 g/m².

When a brazing foil is used in place of the paste, the foil is inserted between the pieces of the tube to be joined. The foil is very easy to place on the tube where desired. The foil is generally of the same composition that is used for the paste filler, i.e., any copper brazing alloy known to those of ordinary skill in the art. A copper-nickel-tin-phosphorus ally, such as OKC600, is preferred. The foil has a thickness of at least about 0.025 mm and is preferably between about 0.01 and 0.05 mm. Typically, no flux, binder, or carrier is needed for this embodiment. Advantageously, the foil does not require a drying step to volatilize any liquid components. The only step necessary is placing the foil where it is necessary. Binder might be necessary, however, to ensure that the foil stays in position.

Once the brazing material is applied, the tube is heated to just over the melting point of the filler of the brazing material. The heating permits the tube to become sufficiently coated or wetted by the brazing material. Preferably, the tube is heated to about 20% over the melting point of the filler, more preferably to about 5% over the melting point. This is in contrast to a process where aluminum is brazed. The melting point of the brazing alloy for aluminum is very close to the melting point of the aluminum tube. The brazing alloy is typically a clad layer over the aluminum that is about 10% of the thickness of the tube wall. Thus, when attempting to melt the aluminum brazing alloy, the danger exists that the tube material will also be melted. The melting point for OKC600 is typically about 600° C. In one embodiment, the tube is heated to about 630° C. In another embodiment, the tube is heated to about 610° C. These temperatures are much lower than the melting points of the copper alloy tubes that are about 1000° C. to 1100° C. Thus, heating the tube to slightly over 600° C. will melt only the brazing alloy and not the tube.

The legs 40, 42 are first coated with paste or a foil is placed between them. The terminal ends of the legs 40, 42 are also coated with the paste or are placed on top of a foil that is placed upon the base. The paste is generally applied along the braze seam 44 as a bead of paste, while the foil is applied along the same braze seam between the terminal ends of the legs and the base as a strip of foil. The tube is then heated to a temperature above the melting point of the brazing material so as to join the material to form the tube. The two legs 40, 42 are brazed together and the legs 40, 42 are also brazed to the base 22. The tube in cross-section resembles a B shape. It has been found that this shape is especially advantageous in accepting braze material, especially fluxless braze material.

The paste or foil is used to seal the tube and prevent leakage of the cooling fluid that flows through the tube. The paste or foil may be deposited on the surfaces of the sheet before, during, or after the tube is formed. Advantageously, the brazing of the tube does not require flux to be added thereto.

The brazing application generally takes place in a furnace. One concern during the process is to prevent oxidation of the tube or the brazing material. The furnace should have a dew point of less than about −40° C. and an oxygen content of less than about 100 ppm. Often, an inert gas atmosphere, such as nitrogen, is used, with a dew point of about −65° C. and a low oxygen content of about 10 ppm.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method of forming a tube for a heat exchanger that comprises:
   providing a sheet of a copper or copper alloy that has a base and two ends;
   folding the ends of the sheet to form legs having sides that oppose one another and sides that oppose the base of the sheet;
   further folding the ends of the sheet toward one another to form a pair of fluid passageways;
   applying a brazing material that can adhere to the sheet material without flux between the opposing sides of the legs and between the base and the sides of the legs that oppose the base of the sheet; and
   applying heat to the sheet and brazing material sufficient to melt the brazing material and have it adhere to the legs and the base to join the legs to one another and to the base of the sheet to form the tube.

2. The method of claim 1, wherein the brazing material comprises a copper alloy that is formulated to have a lower melting temperature than that of the sheet.

3. The method of claim 2, wherein the sheet is heated to no more than about 20% above the melting temperature of the brazing material.

4. The method of claim 2, wherein the brazing material is in the form of a paste or foil.

5. The method of claim 2, wherein the brazing material is in the form of a paste comprising a metal or alloy powder filler, a binder, and a carrier.

6. The method of claim 5, wherein the powder filler has a particle size of between 15 and 30 microns.

7. The method of claim 5, wherein the filler is an alloy of copper, nickel, tin, and phosphorus.

8. The method of claim 6, wherein the filler comprises about 1% to 5% nickel, about 15% to 20% tin, about 4% to 7% phosphorus, and copper.

9. The method of claim 5, wherein the carrier comprises a liquid and the paste brazing material is applied by brushing, spraying, or dispensing.

10. The method of claim 9, wherein the carrier comprises water or an alcohol.

11. The method of claim 9, which further comprises drying the tube after spraying or brushing the paste brazing material onto the sheet to volatilize the carrier.

12. The method of claim 5, wherein the carrier comprises a wax and the paste brazing material is heated during application to the sheet.

13. The method of claim 12, wherein the binder is a thermoplastic material.

14. The method of claim 13, which further comprises melting the wax carrier and thermoplastic material binder prior to applying the brazing material onto the legs and base of the sheet, followed by cooling of the sheet to fix the brazing material in position.

15. The method of claim 4, wherein the brazing material is in the form of a foil that has a thickness of between about 0.01 to 0.05 mm and is applied by placement of the foil between the opposing sides of the legs and between the base and the sides of the legs that oppose the base of the sheet.

16. A method of manufacturing an automobile radiator by preparing a plurality of heat exchanger tubes according to claim 1 and forming the tubes into an automobile radiator.

17. The method of claim 1, wherein the sheet material does not include a cladding layer in areas where the brazing material is applied.

18. A method of forming a tube for a heat exchanger that comprises:
   providing a sheet of a copper or copper alloy that does not include a cladding layer and has a base and two ends;
   folding the ends of the sheet to form legs having sides that oppose one another and sides that oppose the base of the sheet;
   further folding the ends of the sheet toward one another to form a pair of fluid passageways;
   subsequently applying a brazing material that can adhere to the sheet material without flux between the opposing sides of the legs and between the base and the sides of the legs that oppose the base of the sheet, wherein the brazing material comprises a copper alloy that is formulated to have a lower melting temperature than that of the sheet; and
   applying heat to the sheet and brazing material sufficient to melt the brazing material and have it adhere to the legs and the base to join the legs to one another and to the base of the sheet to form the tube.

* * * * *

UNITED STATES PATENT AND TRADEMARK OFFICE
CERTIFICATE OF CORRECTION

PATENT NO.   : 6,530,514 B2                                        Page 1 of 1
DATED        : March 11, 2003
INVENTOR(S)  : Shabtay It is certified that error appears in the above-identified patent and that said Letters Patent is hereby corrected as shown below:

Drawings,
Replace Fig. 1 and Fig. 2 with the following figures, and replace the figure on the title page with Fig. 2.
--

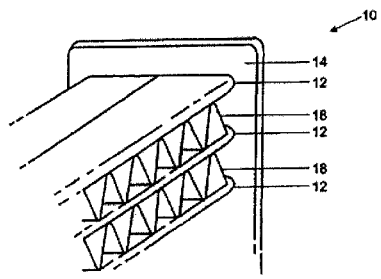

Fig. 1

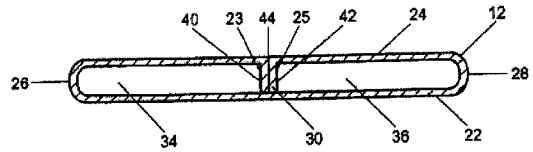

Fig. 2

--

Signed and Sealed this

Eighth Day of July, 2003

JAMES E. ROGAN
*Director of the United States Patent and Trademark Office*